(12) United States Patent
Briglia et al.

(10) Patent No.: US 8,845,786 B2
(45) Date of Patent: Sep. 30, 2014

(54) METHOD FOR PURIFYING A GAS STREAM INCLUDING MERCURY

(75) Inventors: Alain Briglia, Corze (FR); Christian Monereau, Montpellier (FR)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 13/496,022

(22) PCT Filed: Aug. 30, 2010

(86) PCT No.: PCT/FR2010/051795
§ 371 (c)(1),
(2), (4) Date: Mar. 14, 2012

(87) PCT Pub. No.: WO2011/033201
PCT Pub. Date: Mar. 24, 2011

(65) Prior Publication Data
US 2012/0167763 A1   Jul. 5, 2012

(30) Foreign Application Priority Data
Sep. 17, 2009   (FR) ...................... 09 56400

(51) Int. Cl.
*B01D 53/02*   (2006.01)

(52) U.S. Cl.
USPC .................................. 95/134; 95/227; 62/617

(58) Field of Classification Search
USPC ....................... 95/134, 227; 62/617
See application file for complete search history.

(56) References Cited

U.S. PATENT DOCUMENTS

| | | | |
|---|---|---|---|
| 4,889,698 A | 12/1989 | Moller | |
| 5,321,946 A | 6/1994 | Abdelmalek | |
| 2009/0007785 A1 | 1/2009 | Kimura et al. | |
| 2010/0212494 A1 | 8/2010 | Court et al. | |

FOREIGN PATENT DOCUMENTS

| | | |
|---|---|---|
| CA | 983675 | 2/1975 |
| DE | 3919124 | 1/1990 |
| DE | 19717798 | 10/1998 |
| FR | 2918580 | 1/2009 |

OTHER PUBLICATIONS

FR 0956400, French Search Report issued Apr. 16, 2010.
S.M. Wilhelm, "Design Mercury Removal Systems for Liquid Hydrocarbons," Hydrocarbon Processing (Apr. 1999).
J.E. Leeper, "Mercury—LNG's Problem," Hydrocarbon Processing (Nov. 1980).

*Primary Examiner* — Christopher P Jones
(74) *Attorney, Agent, or Firm* — Elwood L. Haynes

(57) ABSTRACT

The present invention relates to a method for purifying a gas stream including $CO_2$, elemental mercury ($Hg^0$) and nitrogen oxides ($NO_x$).

18 Claims, 1 Drawing Sheet

METHOD FOR PURIFYING A GAS STREAM INCLUDING MERCURY

CROSS-REFERENCE TO RELATED APPLICATIONS

This application is a §371 of International PCT Application PCT/FR2010/051795, filed Aug. 30, 2010, which claims § 119(a) foreign priority to French application 0956400, filed Sep. 17, 2009.

BACKGROUND

Field of the Invention

The present invention relates to a method for purifying a gas stream including $CO_2$, elemental mercury ($Hg^0$) and nitrogen oxides ($NO_x$).

SUMMARY OF THE INVENTION

More specifically, it concerns developing a method for purifying the $CO_2$ produced by combustion, particularly by oxyfuel combustion (combustion with pure oxygen or with a gas leaner in nitrogen than air) of an industrial nature, suitable for packaging it for its transport and storage for various uses.

Flue gases produced by the combustion of fossil fuels and/or biomass or from waste incineration or gases from blast furnaces and glass furnaces, may contain heavy metals such as mercury, arsenic, iron, nickel, in the form of metal or salts etc., organic pollutants such as alcohols, aldehydes, ketones, acids, esters, and $SO_x$ or $NO_x$ compounds.

The $CO_2$ capture and storage application requires purification means for removing at least part of the abovementioned impurities and/or components, which are detrimental to the $CO_2$ enrichment process itself and/or to the storage of said $CO_2$ in suitable geological formations.

This is because this $CO_2$ capture and storage application generally requires a $CO_2$ enrichment process, carried out at least partly under cryogenic conditions. In such a $CO_2$ enrichment process, the coldest temperatures reached are generally within the temperature range of $-30/-60°$ C. Such units comprise heat exchangers, liquid-vapor separator drums, and optionally distillation columns.

In general, when high throughputs, for example, of several thousand $Nm^3/h$ (cubic meters per hour under standard conditions) are treated, it is conventional practice in cryogenic units to use aluminum equipment, in particular aluminum brazed plate heat exchangers.

Aluminum brazed plate heat exchangers offer unparalleled performance in terms of heat exchange area per volume of heat exchanger and thermal efficiency, as well as unequalled fluid arrangement possibilities. It is also desirable in this case to use aluminum separator drums and optionally distillation columns, in particular in order to simplify the connections between pieces of equipment.

The industry is familiar with the problems of aluminum corrosion by elemental mercury ($Hg^0$).

Corrosion occurs during the heat exchanger heating phases, when the elemental mercury ($Hg^0$), accumulated in harmless solid form, is liquefied when it reaches its triple point ($-38.83°$ C.).

In order to be able to treat this type of gas, the prior art requires installing an adsorption unit, preferably a retaining bed, to stop the elemental mercury ($Hg^0$) upstream of the vulnerable equipment by lowering the residual mercury content to values<0.1 $\mu g/Nm^3$. Some articles even mention contents<0.01 $\mu g/Nm^3$. This is amply described for example in many articles, such as Hydrocarbon Processing, April 1999, "Design mercury removal Systems for liquid hydrocarbons by S. M. Wilhelm", and Hydrocarbon Processing, November 1980 "Mercury—LNG's problem by J. E. Leeper", for example.

The commonly used adsorbents are generally:
activated carbon, zeolite or alumina generally impregnated with sulfur;
ZnO or alumina containing copper sulfate;
exchanged zeolite.

In the case of a carbon dioxide separation and purification process, it is common for the gas to be treated, containing elemental mercury ($Hg^0$), to also contain nitrogen oxides (NO, $NO_2$).

These nitrogen oxides, particularly nitrogen dioxide ($NO_2$), have harmful effects of various types on the various adsorbents.

In particular, various problems have been identified:

| Adsorbent | Wet Low Pressure | Wet High Pressure | Dry High Pressure |
| --- | --- | --- | --- |
| Sulfur-impregnated activated carbon | Possible oxidation/autoignition of the activated carbon in the presence of $NO_2$ | | |
| Sulfur-impregnated zeolite or alumina | Cannot be scaled up to large units | Suspected co-adsorption of $NO_2$ limiting mercury capture | |
| ZnO containing copper sulfide | Risk of destruction of the support because of the presence of acid, and formation of sulfate with the oxygen present | | Co-adsorption of $NO_2$ limiting the capacity to capture mercury |
| Alumina containing copper sulfate | | | |

The expression "wet low pressure" means a pressure between atmospheric pressure and about 6 bar, and a presence of water higher than a few ppm, in general before the dryers.

The expression "wet high pressure" means a pressure higher than 6 bar, and a presence of water higher than a few ppm, in general before the dryers.

The expression "dry high pressure" means a pressure higher than 6 bar, and a presence of water lower than 1 ppm, in general after the dryers.

The expression "cannot be scaled up to large units" means that the volumes concerned and the resulting pressure drops give rise to non-industrial solutions because of the capital investment and/or energy consumption.

On this basis, one problem that arises is to provide an improved method for treating a gas stream including $CO_2$, nitrogen oxides and elemental mercury ($Hg^0$).

One solution of the invention is a method for purifying a gas stream including $CO_2$, nitrogen oxides and elemental mercury ($Hg^0$) comprising the following consecutive steps:

a) a step of cooling the gas stream to a temperature T1 below the ambient temperature;
b) a step of removing the nitrogen oxides from the cooled gas stream;
c) a step of heating the stream from step b), preferably to a temperature of between 5° C. and 150° C.;
d) a step of removing the elemental mercury ($Hg^0$) from the gas stream from step c); and
e) a step of recovering a $CO_2$-enriched gas stream.

The temperature T1 to which the gas stream is cooled is below the ambient temperature but higher than the elemental mercury ($Hg^0$) deposition temperature under the operating conditions.

Ambient temperature means the temperature that may be reached via cooling by atmospheric air (for example, cooling tower) or by the standard cooling water circuit of the plant.

Depending on the geographic location, the temperature is generally between 45 and 10° C. This means in practice that to reach the temperature T1, any one of the cooling means well known to a person skilled in the art must be implemented (refrigeration unit, iced water, fluid expansion through a valve or turbine, liquid vaporization, etc.).

DETAILED DESCRIPTION OF THE INVENTION

For example, the common mercury contents in the combustion flue gas streams are about 20 µg/Nm³, which corresponds to a mercury vapor pressure of $2.24 \times 10^{-7}$ kPa.

Figure 1:
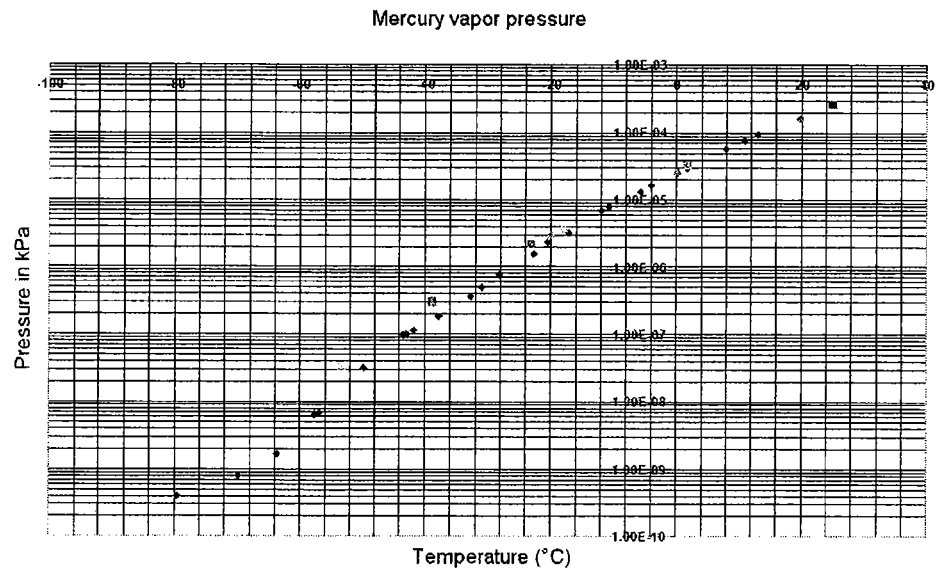
As shown in FIG. 1, the elemental mercury ($Hg^0$) deposition temperature THg is a function of the mercury vapor pressure. Thus, to carry out step a) a person skilled in the art will consider the operating pressure and the mercury content of the gas to be treated.

In the case of a process at 20 bar, a vapor pressure equivalent of $4.48 \times 10^{-6}$ kPa can be considered. However, the graph in FIG. 1, which shows the mercury vapor pressure as a function of temperature (experimental data taken from document NISTIR 6643 of the National Institute of Standards and Technology) indicates that for the value of $4.48 \times 10^{-6}$ kPa, the temperature at which the elemental mercury ($Hg^0$) is deposited would be about −13° C., which is below the temperature at which the $NO_x$ is separated (in this case, about −10° C.), so that no elemental mercury ($Hg^0$) deposition can take place, and the corrosion problem thereby becomes nonexistent. The temperature at which $NO_x$ is separated is generally between −10° C. and −30° C., but broader ranges from +5 to −50° C. are also conceivable.

To define the mercury deposition conditions, the following equation can be used to calculate the vapor pressure PHg (in KPa) as a function of the temperature T (in degrees K):

$$PHg = \exp(-202.56 + 34.26 \ln(T))$$

For an average mercury content in the gas stream corresponding to a partial pressure PHg, the deposition temperature THg is thus calculated, to which a margin is optionally added to determine the minimum temperature T1.

Depending on each case, the inventive method may have one or more of the following features:
- the temperature T1 is higher than the temperature THg of the deposition of the elemental mercury ($Hg^0$) present in the gas stream;
- step a) is carried out using a brazed aluminum heat exchanger, preferably a plate heat exchanger;
- step b) is carried out using a scrubbing column or a cryogenic separation unit;
- step c) is carried out using a brazed aluminum plate heat exchanger, optionally combined with an auxiliary heater, preferably an electric heater or a steam heater;
- step d) is carried out using an adsorption unit comprising at least one adsorbent selected from activated carbon, preferably doped, even more preferably doped with sulfur, an exchanged zeolite, a sulfur-doped zeolite, a sulfur-doped alumina, zinc oxide or an alumina containing copper sulfate;
- the adsorption unit is a retaining bed;
- the gas stream from step d) is cooled to a temperature T2 below the temperature T1 of step a), before undergoing a third stripping step;
- the temperature T2 is lower than the mercury deposition temperature THg;
- the gas stream undergoes a drying step prior to step a), preferably by compression and cooling, followed by an adsorption drying unit of any type (PSA, TSA, etc.);
- the third stripping step serves to at least partially remove at least one impurity from the gas stream, selected from hydrogen, carbon monoxide, nitrogen, oxygen, argon and rare gases;
- the gas stream is a combustion flue gas stream;
- the gas stream is a stream from a blast furnace.

Figure 2:
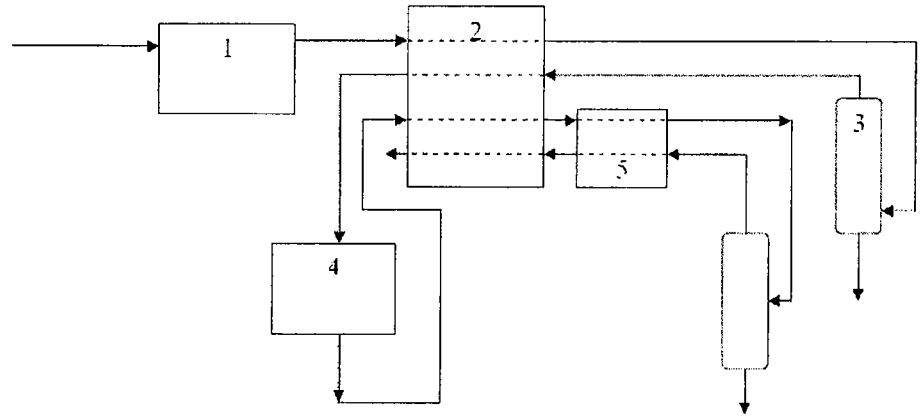
FIG. 2 provies an embodiment of the present invention.

The invention will now be described in greater detail with reference to FIG. 2.

A gas stream including, in addition to $CO_2$, nitrogen oxides and mercury issuing from an oxyfuel combustion process, is previously stripped of the moisture that it contains in a dryer (1). The gas stream thereby stripped of its water is cooled by means of a brazed aluminum plate heat exchanger (2) to a temperature of about −10° C., before undergoing a stripping step in which the nitrogen oxides are removed by means of a scrubbing column (3). The gas stream thus stripped of the nitrogen oxides is then heated in the brazed aluminum plate heat exchanger (2) to a temperature approaching 130° C. (depending on the type of adsorbent installed in the stripper, this temperature may vary between 5° C. and 150° C. to obtain efficient stripping; thus colder stripping could be considered, but this would lower the efficiency of the system). The gas stream thus heated can be stripped of the elemental mercury ($Hg^0$) in a retaining bed (4) containing an adsorbent which has the capacity to capture the elemental mercury ($Hg^0$) such as, for example, doped activated carbon, preferably doped with sulfur, an exchanged zeolite, a sulfur-doped zeolite, a sulfur-doped alumina, zinc oxide or an alumina containing copper sulfate. The gas stream thus stripped of the elemental mercury ($Hg^0$) is again cooled by means of brazed aluminum plate heat exchangers (2 then 5) to a temperature lower than −10° C., so as subsequently to undergo successive treatments for removing other impurities.

In this context, retaining bed means an adsorption unit that is not regenerable in situ, wherein the adsorbent load is at least partially replaced periodically. Note that use could also be made of adsorbents that are regenerable in situ, such as commercially available exchanged zeolite, in a TSA process.

The gas issuing from the purification method according to the invention may undergo further treatment steps at temperatures below the mercury deposition temperature THg in the gas stream to be treated, without any risk of corrosion of the brazed aluminum heat exchangers.

The significant advantage of this invention is to treat gases containing elemental mercury ($Hg^0$) and nitrogen oxides ($NO_2$) in particular on adsorbents which do not have the capacity to manage these two impurities at high pressure.

For a further understanding of the nature and objects for the present invention, reference should be made to the detailed description, taken in conjunction with the accompanying drawing, in which like elements are given the same or analogous reference numbers and wherein:

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for purifying a gas stream including $CO_2$, nitrogen oxides and elemental mercury ($Hg^0$), comprising the following consecutive steps:
   a) cooling the gas stream to a temperature T1 below the ambient temperature;
   b) removing the nitrogen oxides from the cooled gas stream to form a stripped stream;
   c) heating the stripped stream;
   d) removing the elemental mercury (Hg) from the stripped stream by means of at least one adsorbent; and
   e) recovering a $CO_2$-enriched gas stream.

2. The method of claim 1, wherein step c) occurs at a temperature of between 5° C. and 150° C.

3. The method of claim 1, wherein the temperature T1 is higher than a temperature of the deposition of the elemental mercury (Hg) present in the gas stream (THg).

4. The method of claim 1, wherein step a) is carried out using a brazed aluminum heat exchanger.

5. The method of claim 4, wherein the brazed aluminum heat exchanger is a plate heat exchanger.

6. The method of claim 1, wherein step b) is carried out using a scrubbing column or a cryogenic separation unit.

7. The method of claim 1, wherein step c) is carried out using a brazed aluminum plate heat exchanger.

8. The method of claim 7, wherein wherein step c) is carried out using a brazed aluminum plate heat exchanger combined with an auxiliary heater.

9. The method of claim 8, wherein the auxiliary heater is an electric heater or a steam heater.

10. The method of claim 1, wherein step d) is carried out using an adsorption unit comprising at least one adsorbent selected from activated carbon, an exchanged zeolite, a sulfur-doped zeolite, a sulfur-doped alumina, zinc oxide or an alumina containing copper sulfate.

11. The method of claim 10, wherein the activated carbon is doped.

12. The method of claim 11, wherein the activated carbon is doped with sulfur.

13. The method of claim 10, wherein the adsorption unit is a retaining bed.

14. The method of claim 1, wherein the gas stream from step d) is cooled to a temperature T2 below the temperature T1 of step a).

15. The method as claimed in claim 14, wherein the temperature T2 is below the mercury deposition temperature (THg).

16. The method of claim 1, wherein the gas stream undergoes a drying step prior to step a).

17. The method of claim 1, wherein the gas stream is a combustion flue gas stream.

18. The method of claim 1, wherein the gas stream is a stream from a blast furnace.

* * * * *